United States Patent Office 3,352,805
Patented Nov. 14, 1967

3,352,805
POLISH CONTAINING BIS(2-BUTOXYETHYL) 2-BUTOXYETHYLPHOSPHONATE
Daniel A. Lima, Westport, Conn., assignor to FMC Corporation, New York, N.Y., a corporation of Delaware
No Drawing. Filed May 13, 1966, Ser. No. 549,809
1 Claim. (Cl. 260—23.5)

This invention relates to a new phosphorus composition, bis(2-butoxyethyl) 2-butoxyethylphosphonate, which has been found to be highly useful in the production of improved floor polish compositions of the glossy-drying type, as a leveling agent therefor.

Bright-drying floor polishes are generally aqueous emulsions comprising a water-insoluble film former which is either wax, or a waxy resin, with or without additional thermoplastic resin, together with a small percent of a resin which can be solubilized in water by the use of ammonia, and which acts as a leveling agent. These are invariably used in conjunction with a leveling additive which gives flexibility to the film and prevents crawling and cracking. The most universally used additive for this purpose is tris(2-butoxyethyl) phosphate. This material has excellent properties, in that it combines fine leveling ability with good water resistance and very little or no effect on most substrates.

However, there are a few substrates on which tris(2-butoxyethyl) phosphate does have some softening effect. While this effect is not too objectionable in most cases, and can be overcome by keeping the use of the material to a minimum, it would be desirable to have a leveling agent which is less active in this regard. Attempts to find such leveling agents heretofore have been unsuccessful, because even such closely allied agents as tris(2-ethoxyethyl) phosphate are not satisfactory leveling agents. Even bis(2-butoxyethyl) mono($C_6$–$C_{10}$ n-alkyl) phosphate and di($C_6$–$C_{10}$ n-alkyl) (2-ethoxyethyl) phosphate do not do the leveling job properly.

I have found, surprisingly, that while very few phosphates other than tris(2-butoxyethyl) phosphate are useful in floor compositions, a specific phosphonate which has not heretofore been made, bis(butoxyethyl) butoxyethylphosphonate, is indeed a superior leveling agent for emulsion floor polish, producing polishes which have excellent gloss, good water resistance, and good scuff resistance. It is quite surprising that a phosphonate will act in this fashion when phosphates which are closely related to tris(2-butoxyethyl) phosphate yield unsatisfactory results.

The product can be made from tris(butoxyethyl) phosphite by heating in the presence of methyl iodide as a catalyst, and can be made in excellent yield when the process is run using a heel of previously prepared material. The heel is not essential to produce product, but is essential to produce product in good yield.

The precursor material can be made in known fashion by the transesterification of a trialkyl or a triaryl phosphite. The method involving the use of a triaryl phosphite is described in USP 3,101,363. The method starting with trimethyl phosphite is exemplified hereinafter.

The phosphonate of this invention is used in floor polishes in rather low concentrations, of the order of about ¼–2%, depending on the solids content of the polish. There are generally of the order of 10–16%, and optimum results are obtained at about 15% solids with about 1% of the leveling agent, based on total polish weight.

The water-insoluble film former may be wax, or a wax substitute, such as carnauba, montan, paraffin, polyethylene, or Fischer-Tropsch waxes, and the like. These are blended, more often than not, with major quantities of emulsified thermoplastic resins, such as polystyrene, polyacrylate, and polyacrylate-acrylonitrile resins, chosen for both their good properties and their low cost. The polystyrene resins are often sold blended with a small amount of shellac. These waxes and resins generally comprise about 75–90% of the total solids of the emulsion. Mixed with these materials are ammonia solutions of other thermoplastic resins, such as partially esterified modified rosin, and styrene/maleic copolymers, and other similar thermoplastics which are ammonia-soluble. These ammonia solutions act to unify the film and level it somewhat, while at the same time the resins become water-insoluble along with the rest of the material on evaporation of the ammonia.

These resins and formulations are quite well known in the trade, being extensively described in the technical data bulletins of the various suppliers of the resins for the purpose.

The following typical examples of the preparation of the product and its use in floor polish are given by way of examples and not by way of limitation of invention.

EXAMPLE 1

*Preparation of tris(2-butoxyethyl) phosphite*

The apparatus comprised a 12-liter, three-neck flask equipped with a mechanical stirrer, a two-inch by four-foot glass helices-packed column with a magnetic take-off head and condenser, a Y tube fitted with a thermometer and feed funnel, and a heating mantle.

| | | |
|---|---|---|
| Trimethyl phosphite | g | [1] 620 |
| Butyl Carbitol (butyl ether of diethylene glycol) | g | [2] 3240 |
| Toluene | ml | 2000 |

[1] 5 moles.
[2] 20 moles.

The entire system was purged with prepurified nitrogen for several minutes. The reaction flask was charged with the butyl Carbitol and toluene and again purged with nitrogen. A pad of nitrogen was maintained on the system at all times. The trimethyl phosphite was added to the stirred mixture, via the feed funnel, over a one-hour period. No exotherm was noted during the addition of the phosphite. The stirred reaction mixture was gently heated to reflux and the distillate, a binary mixture of methanol and toluene, was removed at a vapor temperature of 66° C. The reflux was regulated so as to maintain the binary vapor temperature as long as the methanol was being formed. After completion of the reaction (four hours) the vapor temperature went up to the toluene plateau. The reaction mixture was cooled to room temperature and a sample was removed and analyzed by Gas Liquid Chromatography (GLC):

| | Percent |
|---|---|
| Toluene | 37.2 |
| Butyl Carbitol | 20.6 |
| Unknown product boiling at 323° C. | 5.7 |
| Desired product—350° C. | 36.5 |

The toluene and excess butyl Carbitol were removed by vacuum stripping on flash-off still to a pot temperature of 152° C. at 0.7 mm. mercury pressure, using a nitrogen sparge.

The stripped crude product, 2452 grams, was made into a yield of 95.4% based on the trimethyl phosphite, and possessed the following analysis (GLC):

| | Percent |
|---|---|
| 225° C., unknown | 1.4 |
| 327° C., unknown | 4.4 |
| 350° C., tris(2-butoxyethyl) phosphite | 94.0 |

EXAMPLE 2

*Preparation of bis(2-butoxyethyl) 2-butoxyethylphosphonate*

The apparatus consisted of a three-liter, three-neck flask equipped with a mechanical stirrer, Y tube fitted with a thermometer and feed funnel, a condenser with a nitrogen purge line at exit and an electric heating mantle.

| | G. |
|---|---|
| (95%) tris(2 - butoxyethyl) phosphite of Example 1 | 1648 |
| Bis(2 - butoxyethyl) 2 - butoxyethylphosphonate (used as heel at start of isomerization) | 133 |
| Methyl iodide (catalyst) | 10 |

The entire system was purged with prepurified nitrogen for several minutes. The reaction flask was charged with 200 g. of tris(2-butoxyethyl) phosphite, 133 g. of bis(2-butoxyethyl) butoxy-ethylphosphonate, and 10 g. of methyl iodide (catalyst). The system was purged with nitrogen for several minutes and a pad of nitrogen was maintained on the condenser at all times. The stirred reaction mixture was gently heated to 180° C. and the remainder of the tris(2-butoxyethyl) phosphite was added, via the feed funnel, over a three and one-half hour period.

The reaction mixture was heated for an additional four and one-half hours at 180° C. The reaction mixture was cooled to room tempreature under a blanket of nitrogen. A sample was removed, analyzed, and found to contain 88.5% bis(2-butoxyethyl) 2-butoxyethylphosphonate by Gas Liquid Chromatography (GLC).

The crude product was distilled on a flash-off vacuum distillation set-up using a nitrogen sparge for stirring.

The product (1560 g.—133 heel added =1427 g.) was collected at a vapor temperature of 176–178° C. at 0.75 mm. mercury pressure and was made in a yield of 86.6%.

| | |
|---|---|
| Total phosphorus | percent__ [1] 18.24 |
| Specific gravity 25° C. | 0.9967 |
| Refractive index 25° C. | 1.4400 |
| Color APHA | 20 |
| Product (by GLC) | percent__ 92.8 |
| Total phosphorus | percent__ [1] 18.24 |

[1] Theory 8.14%.

The following examples show polishes made with the product of Example 2.

EXAMPLE 3

| | Parts by weight |
|---|---|
| Styrene polymer emulsion at 15% solids | 70 |
| Ammonia soluble resin at 15% solids | 15 |
| Polyethylene emulsion at 15% solids | 15 |
| Carbitol (diethylene glycol mono ethyl ether) | 1 |
| Bis(2-butoxyethyl) 2-butoxyethylphosphonate (Example 2) | 1 |
| Dibutyl phthalate | 0.8 |

A film of the above polish was spread on vinyl and asphalt tile at a rate of about 1000 sq. ft. per gallon. Gloss, leveling, and early water spot resistance were all excellent, and removability from both substrates with a standard ammoniacal potassium oleate soap solution was quick and complete.

The styrene polymer of this example is an emulsion of styrene with a small amount of shellac, purchased at 36% solids as RCI Synthemul 40–203, and reduced to 15% solids. The ammonia soluble resin was a styrene/maleic copolymer. The polyethylene emulsion was waxy grade with an ASTM E28 softening point of 214° F.

EXAMPLE 4

| | Parts by weight |
|---|---|
| Styrene polymer at 15% solids | 50 |
| Ammonia soluble resin at 15% solids | 25 |
| Polyethylene emulsion at 15% solids | 25 |
| Carbitol | 1 |
| Bis(2-butoxyethyl) 2-butoxyethylphosphonate | 1 |
| Dibutyl phthalate | 0.5 |

A film of the above buffable polish was spread on vinyl and asphalt tile at a rate of about 1000 sq. ft. per gallon. Gloss, leveling, and water resistance were all rated excellent.

This illustrates another formula with the same ingredients as Example 3.

EXAMPLE 5

Example 3 was repeated, except that a polyacrylate resin was substituted for the styrene polymer, with similar results.

EXAMPLE 6

| | Parts by weight |
|---|---|
| Blend of carnauba and microcrylstalline paraffin wax emulsion at 15% solids | 80 |
| Styrene/maleic copolymer-aqueous ammonia solution at 15% solids | 18 |
| Bis(2-butoxyethyl) 2-butoxyethylphosphonate | 2 |

This formula illustrates the use of wax as the major component of a floor polish.

Obviously the examples can be multiplied without departing from the scope of the invention which is defined in the following claim.

I claim:

In a floor polish composition of the emulsion type consisting essentially of a major portion of a water-insoluble polymer, including a waxy material, and a minor proportion of an ammonia-soluble leveling resin, and from 1 to 2% leveling agent, based on the total polish, the improvement which consists in using as the leveling agent bis(2-butoxyethyl) 2-butoxyethylphosphonate.

References Cited

UNITED STATES PATENTS

| | | |
|---|---|---|
| 2,397,422 | 3/1946 | Kosolapoff. |
| 2,535,172 | 12/1950 | Tawney. |
| 2,681,920 | 6/1954 | Van Winkle et al. |
| 2,927,014 | 3/1960 | Goyette. |
| 2,964,487 | 12/1960 | Chapman. |
| 3,072,492 | 1/1963 | Smith. |
| 3,101,363 | 8/1963 | Baranauckas. |

OTHER REFERENCES

Reprint from Soap and Chemical Specialties, February 1966, Lima and Hopper. (Paper presented during 52nd annual meeting, Chemical Specialties Man'rs. Assoc., Dec. 7, 1965, Washington, D.C.)

MORRIS LIEBMAN, *Primary Examiner.*

LEON BERCOVITZ, *Examiner.*

UNITED STATES PATENT OFFICE
CERTIFICATE OF CORRECTION

Patent No. 3,352,805             November 14, 1967

Daniel A. Lima

It is certified that error appears in the above identified patent and that said Letters Patent are hereby corrected as shown below:

Column 1, line 69, after "be" insert -- a --; Column 3, line 7, "tempreature" should read -- temperature --; line 37, "18.24" should read -- 8.24 --; line 42, cancel "Total hosphorus---------percent----18.24".

Signed and sealed this 29th day of July 1969.

(SEAL)
Attest:

Edward M. Fletcher, Jr.          WILLIAM E. SCHUYLER, JR.
Attesting Officer                     Commissioner of Patents